United States Patent
Hokao

(10) Patent No.: US 7,142,526 B1
(45) Date of Patent: Nov. 28, 2006

(54) MOBILE COMMUNICATION TERMINAL EQUIPMENT, CONTROL METHOD THEREFOR, AND RECORDING MEDIUM ON WHICH CONTROL PROGRAM THEREFOR IS RECORDED

(75) Inventor: Tomoaki Hokao, Tokyo (JP)

(73) Assignee: NEC Corporation, Tokyo (JP)

( * ) Notice: Subject to any disclaimer, the term of this patent is extended or adjusted under 35 U.S.C. 154(b) by 640 days.

(21) Appl. No.: 09/661,195

(22) Filed: Sep. 13, 2000

(30) Foreign Application Priority Data

Sep. 14, 1999 (JP) .................................. 11-259676

(51) Int. Cl.
*H04Q 7/00* (2006.01)

(52) U.S. Cl. ...................... 370/331; 370/335; 370/350; 455/436; 455/456.1

(58) Field of Classification Search ................ 370/331, 370/335, 320, 324, 350; 455/436–438, 440, 455/456.1–456.6, 442, 502, 434, 432.1, 419, 455/435.3, 444, 443, 449, 421
See application file for complete search history.

(56) References Cited

U.S. PATENT DOCUMENTS

| | | | | |
|---|---|---|---|---|
| 5,509,027 A | * | 4/1996 | Vook et al. .................. | 375/134 |
| 5,577,022 A | * | 11/1996 | Padovani et al. ........... | 370/332 |
| 5,623,535 A | * | 4/1997 | Leung et al. ................ | 455/444 |
| 5,734,980 A | | 3/1998 | Hooper et al. | |
| 5,889,768 A | | 3/1999 | Storm et al. | |
| 5,903,832 A | * | 5/1999 | Seppanen et al. ......... | 455/435.3 |
| 5,950,130 A | * | 9/1999 | Coursey ................... | 455/432.1 |
| 5,950,131 A | * | 9/1999 | Vilmur ....................... | 455/434 |
| 6,154,455 A | * | 11/2000 | Mekkoth et al. ............ | 370/342 |
| 6,157,626 A | * | 12/2000 | Nakamura et al. .......... | 370/328 |
| 6,173,181 B1 | * | 1/2001 | Losh ........................... | 455/434 |
| 6,526,091 B1 | * | 2/2003 | Nystrom et al. ............. | 375/142 |
| 6,625,451 B1 | * | 9/2003 | La Medica et al. ......... | 455/434 |
| 6,628,946 B1 | * | 9/2003 | Wiberg et al. .............. | 455/434 |
| 6,643,319 B1 | * | 11/2003 | Suzuki et al. ................ | 375/145 |

FOREIGN PATENT DOCUMENTS

| | | |
|---|---|---|
| EP | 0 701 382 A1 | 3/1996 |
| EP | 0 880 294 A2 | 11/1998 |
| JP | 7-298332 | 11/1995 |
| JP | 7-312771 | 11/1995 |
| JP | 10-94041 | 4/1998 |

(Continued)

OTHER PUBLICATIONS

"UMTS Terrestrial Radio Access Concept Evaluation", ETSI Technical Report, XP-002109765, Dec. 1997, pp. 47-48.

*Primary Examiner*—Doris H. To
*Assistant Examiner*—Ian N. Moore
(74) *Attorney, Agent, or Firm*—Sughrue Mion, PLLC

(57) ABSTRACT

Mobile communication terminal equipment for a CDMA cellular phone system includes a detection section, memory section, control section, and measurement section. The detection section performs cell detection by detecting the scramble codes of a visiting cell and neighboring cell. The memory section stores scramble codes. The control section controls to write the scramble codes of the visiting cell and neighboring cell, detected by the detection section, into the memory section. The measurement section measures the detection frequencies of the scramble codes and intra-cell stay times. A control method for cell detection in mobile communication terminal equipment for a CDMA cellular phone system and a recording medium recording a program for a control method for cell detection in mobile communication terminal equipment for a CDMA cellular phone system are also disclosed.

17 Claims, 11 Drawing Sheets

FOREIGN PATENT DOCUMENTS

| | | |
|---|---|---|
| JP | 10-126830 | 5/1998 |
| JP | 10-200508 | 7/1998 |
| WO | WO 99/43181 A1 | 8/1999 |

* cited by examiner

MOBILE COMMUNICATION TERMINAL EQUIPMENT, CONTROL METHOD THEREFOR, AND RECORDING MEDIUM ON WHICH CONTROL PROGRAM THEREFOR IS RECORDED

BACKGROUND OF THE INVENTION

1. Field of the Invention

The present invention relates to mobile communication terminal equipment, a control method therefor, and a recording medium on which a control program therefor is recorded and, more particularly, to an improvement in a cell detection method in mobile communication terminal equipment using CDMA (Code Division Multiple Access).

2. Description of the Prior Art

In a cellular mobile communication system, a wide service area is constituted by a plurality of cells each covering a relatively small range, and a mobile station that moves in this service area communicates with a base station installed in each cell. As the mobile station moves, therefore, the base stations installed in the respective cells which are optimal for communication sequentially change. For this reason, in the mobile communication system, selection of an optimal base station for communication, i.e., so-called cell detection (cell selection), must be performed.

Whether cell detection is accurately performed is greatly influenced by a subscriber capacity, communication quality, and the like. That is, when a remote cell is erroneously selected, both the mobile station and the base station perform transmission with larger transmission power than when a correct cell is selected. This increases interference in other stations, and the signal power to interference noise power ratios in the other stations decrease, resulting in a deterioration in communication quality. In addition, as the interference increases, the number of stations that can simultaneously communicate decreases, resulting in a decease in subscriber capacity.

A conventional cell detection method will be described below. In a CDMA cellular phone system, each cell (base station) has a unique scramble code. A mobile unit (mobile station) as mobile communication terminal equipment detects (searches) such a scramble code to perform cell detection (base station detection), i.e., specify a scramble code group. FIG. 1 shows the frame format of a cell search radio channel used in this case.

As shown in FIG. 1, a radio frame is constituted by the 1st to 15th time slots (to be simply referred to as slots hereinafter), and each slot is constituted by PCCPCH (Primary Common Control Physical Channel) and SCH (Synchronization Channel). PCCPCH is spread by a spreading code common to all the cells, and is further spread by a scramble code unique to the cell. This scramble code has a radio frame period (10 msec).

SCH is obtained by multiplexing P-SCH (Primary SCH) and S-SCH (Secondary SCH). P-SCH is spread by a spreading code (first search code) common to all the cells but is not scrambled. This first search code is a pattern common to all the slots. S-SCH is spread by a spreading code (second search code) determined by a scramble code group to which the scramble code used for PCCPCH belongs, but is not scrambled. These second search codes have different patterns for the respective slots in a radio frame. There are 32 scramble code groups. One group includes 16 scramble codes. That is, there are 32 types of second search codes.

A mobile unit performs a cell search by receiving this radio frame from a base station in accordance with the flow chart of FIG. 2. More specifically, an SCH portion is despread by using the first search code (known) common to all the cells (steps S131 and S132) to detect P-SCH (step S133). That is, the start timing of slots is recognized, and slot synchronous processing is performed (step S134). Note that the start timing of the frame cannot be recognized.

All the 32 types of second search codes are used to despread the SCH portion (steps S135 and S136) to detect S-SCH. In this case, a scramble code group is specified from the second search code having the largest correlation value (steps S137 and S138). Since the second search codes have different patterns for the respective slots, the start timing of the frame can be simultaneously recognized, thus performing frame synchronous processing.

Subsequently, PCCPCH is despread by using all the 16 types of scramble codes that belong to the specified scramble code group and the PCCPCH spreading code (known) common to all the cells, thereby detecting correlation values and specifying a scramble code having the largest correlation value. The relationship between scramble code groups and scramble codes will be described. For the sake of descriptive convenience, assume that the total number of scramble codes is 100. In this case, if the 100 scramble codes are used one by one in cell search, it takes much time. For this reason, the scramble codes are formed into groups each including 10 scramble codes as follows:

| | |
|---|---|
| scramble codes 1, 2, . . . , 10 → | scramble code group 1 |
| scramble codes 11, 12, . . . , 20 → | scramble code group 2 |
| scramble codes 21, 22, . . . , 30 → | scramble code group 3 |
| . . . | |
| scramble codes 91, 92, . . . , 100 → | scramble code group 10 |

The base station transmits a cell detection search code (equivalent to a second search code) corresponding to a scramble code group to which the self-scramble code belongs. As described above, the mobile station detects this cell detection search code to specify the corresponding scramble code group, and knows a scramble code unique to the base station (cell search) by using 10 scramble codes belonging to this group. This makes it possible to shorten the cell search time.

Since despread processing needs to be performed by using all the scramble codes belonging to the scramble code group specified by the above method, it takes much time to perform a cell search. In order to shorten the cell detection time, a plurality of correlators may be concurrently operated. In this method, however, the circuit size increases accordingly.

As conventional techniques for performing a cell search in a short period of time, the techniques disclosed in Japanese Unexamined Patent Publication Nos. 7-298332 and 7-312771 are available. According to the former technique, base stations notify a mobile station of pieces of neighboring cell monitoring code information, and the pieces of notified cell code information are sequentially scanned in a predetermined order of priority, thus performing a cell search.

In this method, a cell search is performed depending on pieces of neighboring cell monitoring code information from base stations regardless of the movement history of the mobile station itself. Therefore, this method is effective in a cell search in handover operation, but cannot shorten the cell search time at power-on. In addition, base stations must transmit neighboring cell monitoring code information.

According to the latter technique (Japanese Unexamined Patent Publication No. 7-312771), a search is made for the cell detection search code of the cell with which a mobile station has communicated most recently, or a search is made in the order of priority corresponding to the visiting cell history of a mobile station. This method is effective in a cell search at power-on, but is not effective in a cell search in handover operation.

SUMMARY OF THE INVENTION

The present invention has been made in consideration of the above situation, and has as its object to provide mobile communication terminal equipment which can shorten the time required for a cell search at the time of handover as well as at power-on, thereby reducing the power consumption in the cell search, a control method therefor, and a recording medium recording a control program therefor.

In order to achieve the above object, according to the first aspect of the present invention, there is provided mobile communication terminal equipment for a CDMA cellular phone system, comprising detection means for performing cell detection by detecting scramble codes of a visiting cell and neighboring cell, memory means for storming a scramble code, control means for controlling to write the scramble codes of the visiting cell and neighboring cell, detected by the detection means, into the memory means, and measurement means for measuring detection frequencies of the scramble codes and intra-cell stay times.

The control means in the first aspect can perform control so as to store the scramble codes in the memory means in response to user operation, perform control so as to automatically store the scramble codes in the memory means in accordance with the detection frequencies of the scramble codes, perform control so as to automatically store the scramble codes in the memory means in accordance with the intra-cell stay times, or perform control so as to store the scramble codes in the memory means upon assigning priorities thereto in detecting operation.

The control means in the first aspect can control the detection means as follows.

The control means can control the detection means so as to perform cell detection by preferentially using the scramble codes stored in the memory means, control the detection means so as to perform cell detection by using a plurality of scramble codes, stored in the memory means, in the descending order of priorities, control the detection means so as to perform cell detection by using a scramble code other than the scramble codes stored in the memory means when cell detection cannot be performed by using the scramble codes stored in the memory means, control the detection means so as to perform cell detection by preferentially using a scramble code exhibiting a high detection frequency in the past, or control the detection means so as to perform cell detection by preferentially using a scramble code exhibiting a long stay time in the past.

The control means in the first aspect can control the detection means, which is configured to specify a scramble code group at the time of detection of a cell, as follows. The control means can control the detection means so as to perform cell detection by preferentially using a scramble code which belongs to the specified scramble code group and is stored in the memory means, or control the detection means so as to perform cell detection in accordance with a priority of a scramble code which belongs to the specified scramble code group and is stored in the memory means.

The control means in the first aspect can control the detection means, which is configured to specify a scramble code group at the time of detection of a neighboring cell in a handover state, as follows. The control means can control the detection means so as to perform neighboring cell detection by preferentially using a scramble code which belongs to the specified scramble code group and is stored as a scramble code of the neighboring cell in the memory means.

The control means in the first aspect can perform control so as to specify a scramble code group by preferentially using a scramble code group to which a scramble code stored in the memory means belongs, when the detection means specifies the scramble code group.

In order to achieve the above object, according to the second aspect of the present invention, there is provided a control method for cell detection in mobile communication terminal equipment for a CDMA cellular phone system, comprising the detection step of performing cell detection by detecting scramble codes of a visiting cell and neighboring cell, the storage step of storing the detected scramble codes of the visiting cell and neighboring cell, and the measurement step of measuring detection frequencies of the scramble codes and intra-cell stay times.

The storage step in the second aspect comprises storing the scramble codes in the memory means in response to user operation, automatically storing the scramble codes in the memory means in accordance with the detection frequencies of the scramble codes, automatically storing the scramble codes in the memory means in accordance with the intra-cell stay times, or storing the scramble codes in the memory means upon assigning priorities thereto in detecting operation.

The detection step in the second aspect comprises performing cell detection by preferentially using the scramble codes stored in the memory means, performing cell detection by using a plurality of scramble codes, stored in the memory means, in the descending order of priorities, performing cell detection by using a scramble code other than the scramble codes stored in the memory means when cell detection cannot be performed by using the scramble codes stored in the memory means, performing cell detection by preferentially using a scramble code exhibiting a high detection frequency in the past, or performing cell detection by preferentially using a scramble code exhibiting a long stay time in the past.

The detection step in the second aspect comprises the step of specifying a scramble code group at the time of detection of the scramble code, and the step of performing cell detection by preferentially using a scramble code which belongs to the specified scramble code group and is stored in the memory means.

The detection in the second aspect comprises the step of specifying a scramble code group at the time of detection of the scramble code, and the step of performing cell detection in accordance with a priority of a scramble code which belongs to the specified scramble code group and is stored in the memory means.

The detection step comprises the step of specifying a scramble code group at the time of detection of a neighboring cell in a handover state, and the step of performing neighboring cell detection by preferentially using a scramble code which belongs to the specified scramble code group and is stored as a scramble code of the neighboring cell in the memory means.

In addition, the detection step comprises the step of specifying a scramble code group by preferentially using a scramble code group to which a scramble code stored in the memory means belongs, when specifying the scramble code group.

In order to achieve the above object, according to the third aspect of the present invention, there is a recording medium recording a program for a control method for cell detection in mobile communication terminal equipment for a CDMA cellular phone system, the program comprising the detection step of performing cell detection by detecting scramble codes of a visiting cell and neighboring cell, the storage step of storing the detected scramble codes of the visiting cell and neighboring cell, and the measurement step of measuring detection frequencies of the scramble codes and intra-cell stay times.

The functions of the present invention will be described next. According to the present invention, a mobile unit has a "cell detection learning function". First of all, a cell (scramble code) that is detected by a mobile unit in a place where the user frequently visits, e.g., the home, the office, or the path along which the user commutes, is stored in the memory. Alternatively, a scramble code that is always detected by the mobile unit may be checked, and the above information may be automatically stored in the memory in accordance with the detection frequency of the scramble code or intra-cell stay time. In any case, scramble codes are preferably prioritized in accordance with detection frequencies and intra-cell stay times and stored.

In a mobile unit having the cell detection learning function, a scramble code group is specified in cell detection. If any scramble codes of the scramble code group are stored in the memory, despreading is performed by using the scramble codes in the descending order of priorities. If there is no scramble code exhibiting a high correlation value, despreading is performed by using the remaining scramble codes of the scramble code group. In this manner, a scramble code exhibiting a high detection frequency is stored in the memory to be preferentially used, thereby shortening the time for cell detection.

Second, if a mobile unit is simultaneously communicating with a plurality of base stations, e.g., in a diversity handover state, the mobile unit stores a set of scramble codes unique to the respective cells in the memory. That is, the mobile unit stores the information of the scramble code of a neighboring cell as well.

When the reception level of radio waves from a current target base station decreases during standby or speech communication, the mobile unit tries to find another station by newly performing cell detection. In this case, if a neighboring scramble code of the scramble code of the current target cell is stored in the memory, despreading is performed by preferentially using the stored code as in the first case. The time for cell detection can be shortened by storing the scramble code of a neighboring cell in the memory in advance and preferentially using it.

According to the present invention, in CDMA mobile communications, the time for a cell search can be shortened. As a consequence, the power consumption in a cell search can be reduced. This is because the scramble codes of cells exhibiting high detection frequencies are stored in the memory in advance and can be preferentially used in a cell search.

The above effects can be obtained not only when the mobile telephone is powered on but also when a cell search is made in handover operation. This is because the scramble codes of cells near a cell exhibiting a high detection frequency are stored in the memory in advance and can be preferentially used in a cell search.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENT

Figure 3:
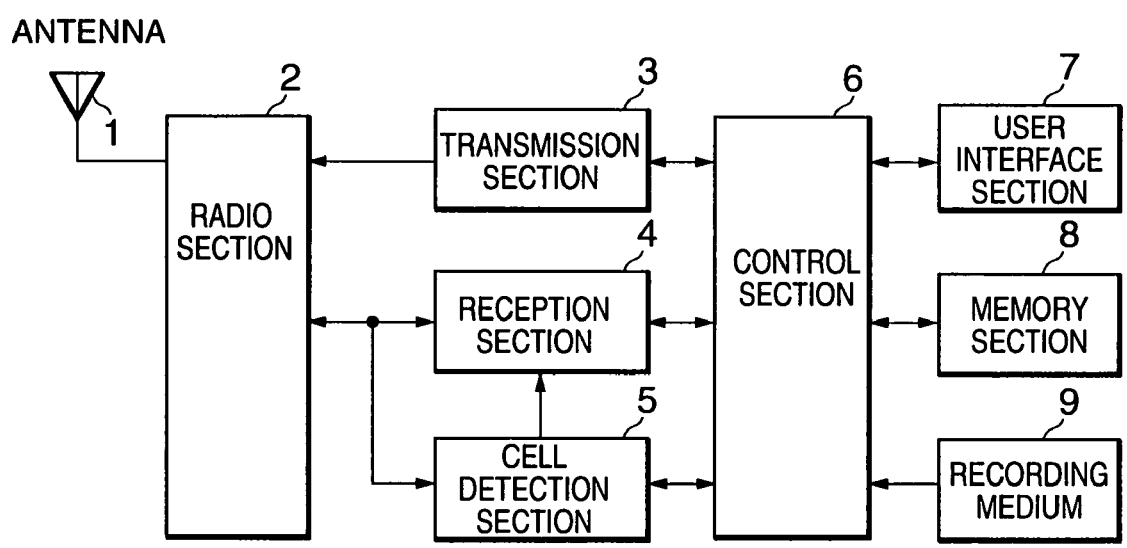
FIG. 3 is a block diagram showing the overall arrangement of an embodiment of the present invention.

A preferred embodiment of the present invention will be described below with reference to the accompanying drawings. FIG. 3 is a block diagram showing the overall arrangement of an embodiment of the present invention. Referring to FIG. 3, an antenna 1 and radio section 2 are used to transmit/receive radio data. A transmission section 3 has the function of performing transmission data processing such as error correction, spreading, and scrambling. A reception section 4 performs reception data processing such as despreading, channel estimation, and RAKE combining.

A cell detection section 5 performs a cell search. That is, the cell detection section 5 establishes synchronization with a base station in accordance with reception data and specifies a scramble code unique to the base station. A control section 6 performs various control operations in the mobile unit. The control section 6 is generally formed from a CPU, and controls, in particular, storage of scramble codes detected by the cell detection section 5 into a memory section 8, measurement of the frequencies of detection of scramble codes, measurement of intra-cell stay times, determination/updating of cell detection priorities, scramble codes in cell detection, and the like. The control section 6 performs control operation in accordance with the sequences based on the operation programs stored in a recording medium 9 in advance. As the recording medium 9, a volatile memory can be used as well as a nonvolatile memory, or another flash memory such as a magnetic recording medium, optical recording medium, or magnetooptic recording medium can be used.

A user interface section 7 is the user interface section of a mobile unit. In the present invention, in particular, information about a visiting cell and neighboring cells can be stored in the memory section 8 by manual operation performed by a user. The memory section 8 is a memory for storing various settings in the mobile unit. In the present invention, in particular, scramble codes with high detection frequencies can be stored, and priorities can be assigned to scramble codes (cell detection).

Figure 4:
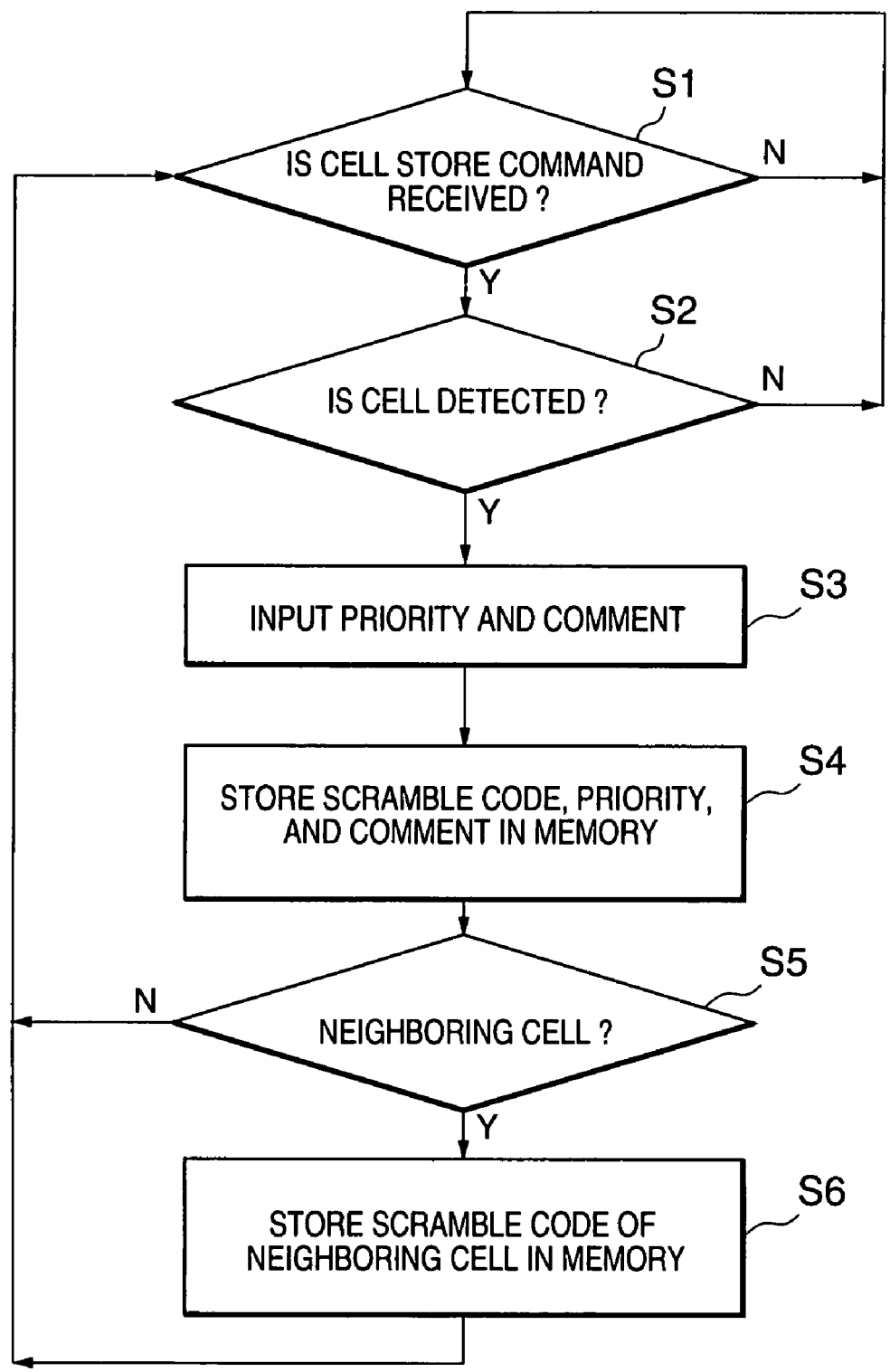
FIG. 4 is a flow chart showing a procedure for storing cell information by user operation according to the present invention.

The operation of the embodiment of the present invention will be described next with reference to the flow charts of FIGS. 4 to 11. FIG. 4 shows a procedure for storing cell information by user operation. The user issues a cell store command by manual operation (step S1). As a key for this user operation, a dedicated key may be mounted on the user interface section 7 or a function key may be provided.

It is checked whether any cell (scramble code) is currently detected by the cell detection section 5 (step S2). If any cell is currently detected, the flow advances to step S3. If NO cell is currently detected, the flow returns to step S1. The user performs manual operation to input the priority of the currently detected scramble code and a comment (step S3).

Assume that this scramble code is included in a scramble code group in subsequent cell search operation. In this case, the higher the priority set in this case, the earlier the scramble code is used to perform despreading. That is, a scramble code with a higher priority can be detected in a shorter period of time. For example, priorities may be expressed by numeric values in ten steps. However, such an expression method depends on the capacity of the memory section 8 and the like. Therefore, any expression method is not specified in this case.

A comment is information such as "home" or "○○ station", which is stored in correspondence with a scramble code, as needed. For example, such a comment may be used such that an alarm is generated upon arrival at ○○ station.

The scramble code, the priority of cell detection, and the comment are stored in the memory section 8 (step S4). It is then checked whether any neighboring cell (neighboring scramble code), other than the above scramble code, is detected by the cell detection section 5 (step S5). If any neighboring cell is detected, the flow advances to step S6 to store a set of the scramble code of this neighboring cell and the scramble code of the cell detected in step S2 in the memory.

If NO (N) in step S5, the flow returns to step S1. A method of detecting this neighboring cell will be briefly described. In detecting a visiting cell, not only the code of the visiting cell with the largest correlation value (see step S137 in FIG. 2) but also the code of the neighboring cell with the second largest correlation value are detected. The presence/absence of this code is therefore equivalent to the presence/absence of a neighboring cell in step S5 in FIG. 4.

The neighboring scramble code is stored in the memory section 8 in association with the scramble code, the priority of cell detection, and the comment in step S4. In subsequent cell search operation, if a scramble code neighboring on the currently detected scramble code is known, the time required to detect a cell at a handover destination can be shortened (see the flow chart of FIG. 10 to be described later).

Figure 5:
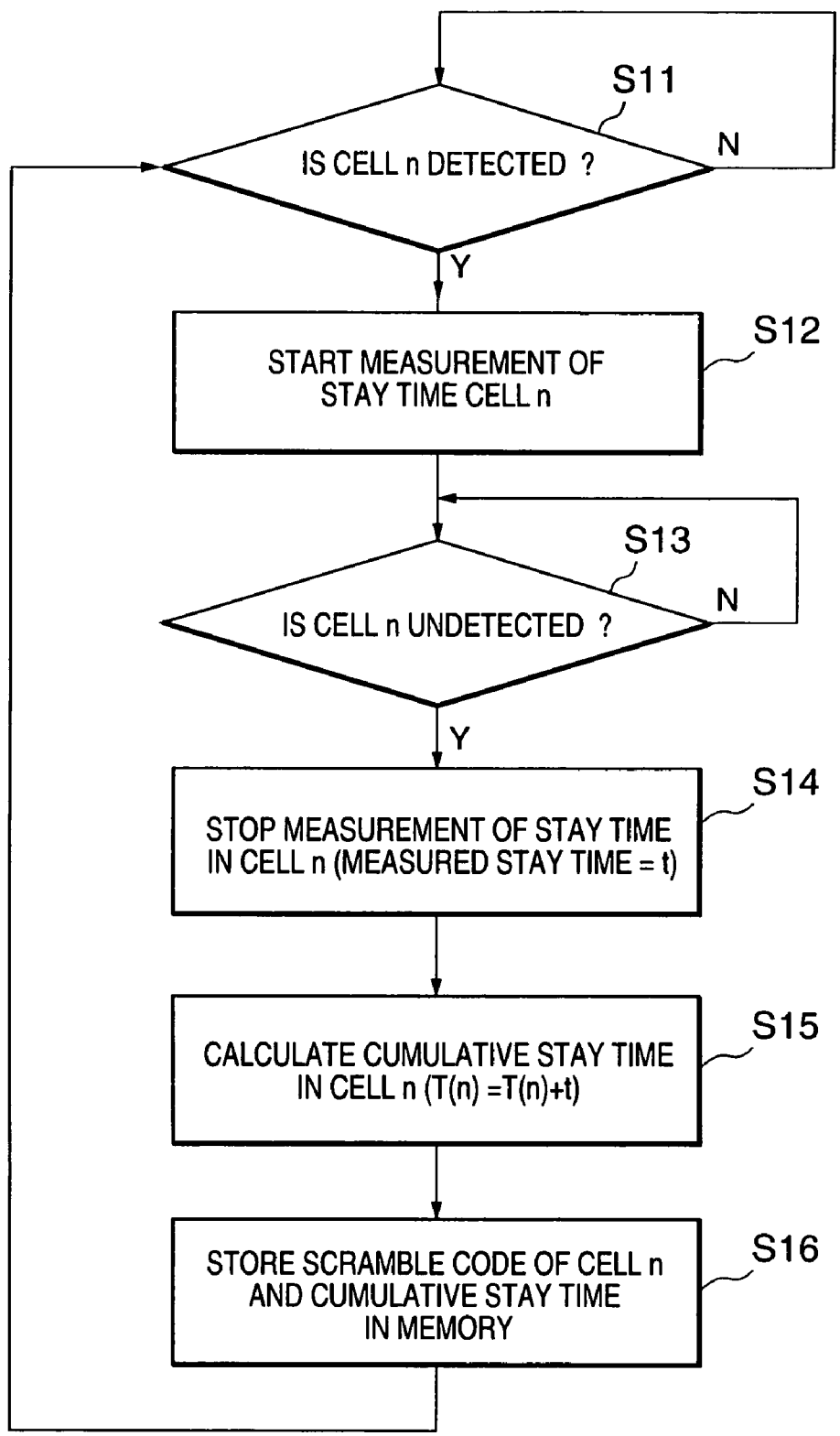
FIG. 5 is a flow chart showing a procedure for measurement of an intra-cell stay time and automatic storage processing according to the present invention.

Measurement of intra-cell stay times and automatic storage processing will be described next with reference to FIG. 5. If the cell detection section 5 detects a cell n (n is a number for identifying a cell and can be regarded as a scramble code) (step S11), the control section 6 starts measurement of an stay time in the cell n (step S12). After the cell n is detected, the cell detection section 5 always re-detects the cell n. If the cell n cannot be re-detected (step S13), the measurement of a stay time in the cell n by the control section 6 is terminated (step S14). The measured stay time is represented by t.

The control section 6 calculates a cumulative stay time T(n) in the cell n. More specifically, the control section 6 adds the currently measured stay time t to the cumulative stay time T(n) in the cell n before the current measurement to obtain the latest cumulative stay time T(n) in the cell n (step S15). The scramble code of the cell n and cumulative stay time T(n) are stored in the memory section 8 (step S16). In this case, the cumulative stay time can be reset by manual operation performed by the user. This embodiment may have a means for automatically resetting the cumulative stay time when the cell detection frequency decreases, which will be described with reference to FIG. 6.

Figure 6:
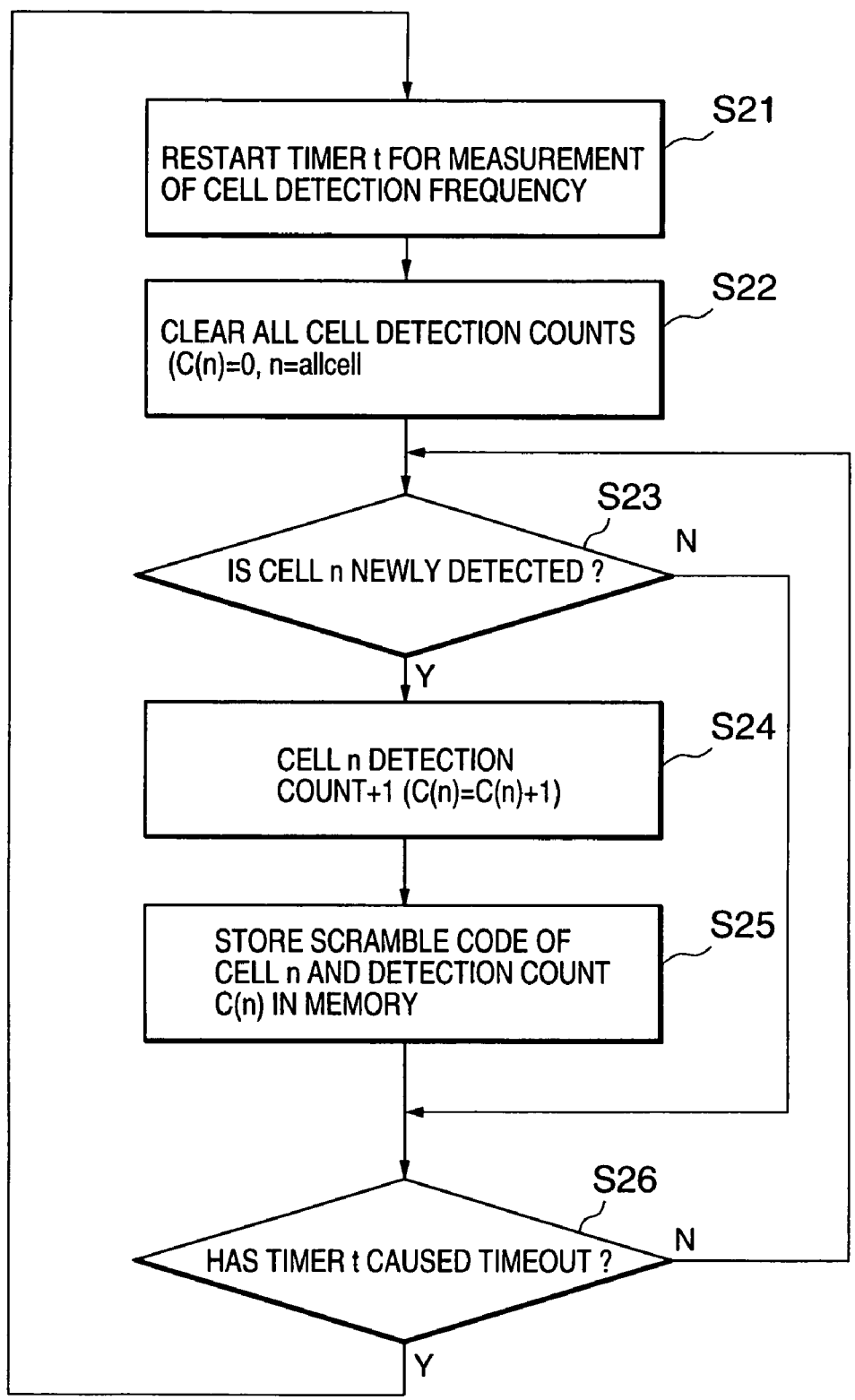
FIG. 6 is a flow chart showing a procedure for measurement of a cell detection frequency and automatic storage processing according to the present invention.

Measurement of a cell detection frequency and automatic storage processing will be described next with reference to FIG. 6. The control section 6 restarts a timer for cell detection frequency measurement (step S21). This timer may be restarted by manual operation performed by the user. Basically, however, the time is repeatedly restarted every time the timeout period set by the user elapses. A timeout period is set to count the number of times (frequency) the user visits a given cell within the timeout period. Therefore, a relatively long period of time, e.g., one week, is preferably set as a timeout period.

The control section 6 clears all the cell detection counts stored in the memory section 8 (step S22). If the cell n is newly detected by the cell detection section 5 (step S23), the flow advances to step S24. Otherwise, the flow advances to step S26. After the detection of the cell n, the cell n is always re-detected. However, the cell detection count is incremented only when the cell n is detected for the first time in an undetected state. That is, even if the mobile unit keeps staying in the same cell, the cell detection count is not incremented. This cell detection count is incremented only when the mobile unit visits the cell again after it moved away from the cell.

The control section 6 increments the cell n detection count by one. That is, the control section 6 adds one to a cell n detection count C(n) before the current detection to set the latest cell n detection count C(n) (step S24). The scramble code of the cell n and the detection count C(n) are stored in the memory section 8 (step S25). If the timer for cell detection frequency measurement causes a timeout (step S23), the flow advances to step S21. Otherwise, the flow advances to step S23. With the use of the timer for cell detection frequency measurement, a cell where the mobile unit has recently visited at frequent intervals can be stored. That is, the number of times of detection of a cell where the mobile unit previously visited at frequent intervals but has rarely visited recently is cleared by restarting operation at a timeout.

Figure 7:
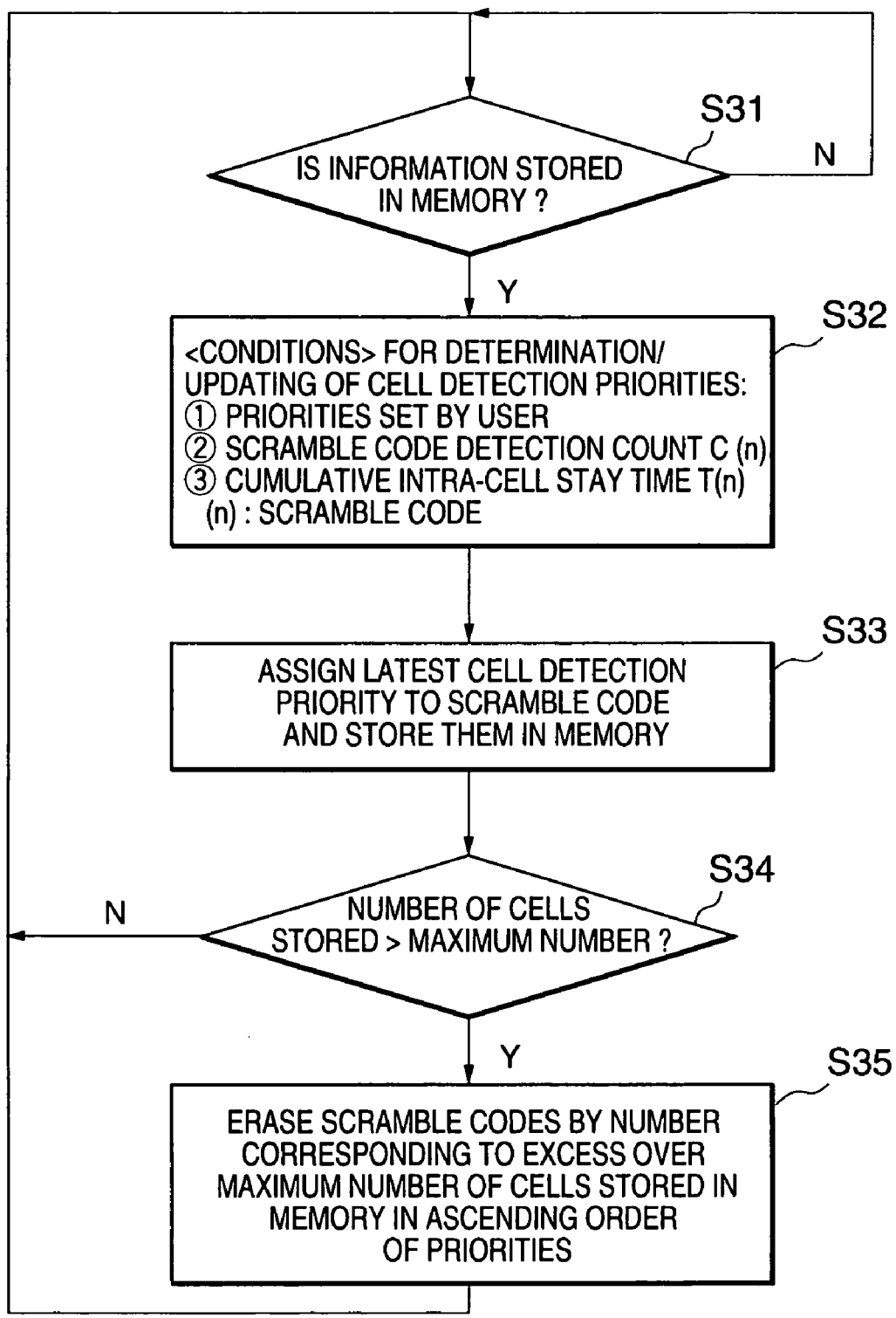
FIG. 7 is a flow chart showing a procedure for determining a cell detection priority according to the present invention.

A procedure for determining cell detection priorities will be described next with reference to FIG. 7. If any cell information (a scramble code and the like) stored by any one of the methods shown in the flow charts of FIGS. 4, 5, and 6 is stored in the memory section 8 (step S31), the cell detection priorities of all the cells (scramble codes) stored in the memory section 8 are determined/updated (step S32). The cells stored in the memory section 8 include those stored by manual operation performed by the user, automatically stored together with the cell detection counts C(n), and automatically stored together with the intra-cell cumulative stay times T(n).

In this case, the control section 6 prioritizes all the cells under given conditions. That is, the control section 6 determines cell detection priorities. As described above, if the scramble code of a given cell is included in a scramble code group in a subsequent cell search, despreading is performed by using the scramble code earlier as the priority becomes higher. That is, a cell with a higher priority can be detected in a shorter period of time.

Conditions for priority determination include the priorities set by manual operation performed by the user, the automatically stored cell detection counts C(n), and the intra-cell cumulative stay times T(n). The most effective priorities for a subsequent cell search are determined under these conditions as a whole. In this case, an algorithm for this operation is not specified. If, for example, the highest priority is assigned to the user settings, and importance is attached to a cell where the mobile unit has recently visited at frequent intervals, a method of assigning higher priorities with an increase in the cell detection count C(n) can be used.

The latest cell detection priorities are assigned to the respective scramble codes and stored in the memory section 8 (step S33). If the number of pieces of cell information (the number of scramble codes) stored in the memory section 8 exceeds a predetermined maximum number of cells that can be stored in the memory section 8, the flow advances to step S35. Otherwise, the flow advances to step S31.

If the number of pieces of cell information exceeds the maximum number of cells that can be stored in the memory section 8, cell information (scramble codes and the like) corresponding to an excess over the maximum number of cells that can be stored is erased from the memory section 8 (step S35). Since the storage capacity of the memory section 8 is limited, cells with low priorities are erased from the memory to always hold optimal cell information. For example, always holding cell information with the 10 top priorities is effective control operation.

In this case, the above operation flow should be executed at a certain frequency as long as a plurality of pieces of cell information are stored in the memory section 8. This makes it possible to always make a cell search under optimal conditions.

A cell search method will be described next with reference to FIG. 8. First of all, the cell detection section 5 starts a cell search (step S41). For example, this operation is performed when the mobile unit is powered on or handover operation is performed. The cell detection section 5 then specifies a scramble code group number (step S42). If any cell information is stored in the memory section 8 (step S43), the flow advances to step S44. Otherwise, the flow advances to step S52.

If any of a plurality of scramble codes that belong to the specified scramble code group is stored in the memory section 8 (step S44), the flow advances to step S45. Otherwise, the flow advances to step S52. The reception data is despread by using the scramble code which belongs to the scramble code group specified by the cell detection section 5 and is stored in the memory section 8 (step S45).

As a result of step S45, a scramble code C with the largest correlation value is selected (correlation value=P) (step S46). If the correlation value P is equal to or larger than a predetermined cell detection threshold (step S47), the flow advances to step S48. Otherwise, the flow advances to step S49. If the correlation value P is equal to or larger than the threshold, a scramble code is specified as C (cell detection) (step S48). If the correlation value P is smaller than the threshold, the cell detection section 5 despreads the reception data by using the remaining scramble codes (not stored in the memory section 8) that belong to the specified scramble code group specified (step S49). As a result, the scramble code C with the largest correlation value is selected (correlation value=P) (step S50). If it is determined in step S51 that the correlation value P is equal to or larger than the predetermined cell detection threshold, the flow advances to step S48. Otherwise, the flow advances to step S41.

If NO in step S43 or S44, the cell detection section 5 despreads the reception data by using all the scramble codes belonging to the specified scramble code group specified (step S52). In this case, the same cell search method as that in the prior art is used, and hence much time is required.

As a result of step S52, the scramble code C with the largest correlation value is selected (correlation value=P) (step S53). If the correlation value P is equal to or larger than the predetermined cell detection threshold (step S54), the flow advances to step S48. Otherwise, the flow advances to step S41.

A faster cell search method will be described next with reference to FIG. 9. In step S45 in FIG. 8, the reception data is despread by using the scramble codes which belong to the specified scramble code group and are stored in the memory section 8 in "the descending order of cell detection priorities", thereby implementing faster cell detection. Therefore, as an operation flow in this case, only a case wherein any of a plurality of scramble codes belonging to the scramble code group specified in a cell search is stored in the memory section 8 will be described.

First of all, any of a plurality of scramble codes belonging to the scramble code group specified by the cell search made by the cell detection section 5 is stored in the memory section 8 (step S61). The control section 6 then makes a list of scramble codes which belong to the specified scramble code group and are stored in the memory section 8 (step S62).

If it is determined in step S63 that at least one scramble code is included in the scramble code list, the flow advances to step S64. Otherwise, the flow advances to step S69. In step S64, the cell detection section 5 despreads the reception data by using the scramble code with the highest cell detection priority in the scramble code list.

As a result of step S64, the correlation value is set to P (scramble code "C") (step S65). If it is determined in step S66 that the correlation value P is equal to or larger than a predetermined cell detection threshold value, the flow advances to step S67. Otherwise, the flow advances to step S68. If it is determined in step S66 that the correlation value P is equal to or larger than the threshold, the scramble code is specified as "C" (cell detection) (step S67). Otherwise, the control section 6 deletes the scramble code "C" from the scramble code list, and the flow returns to step S63.

If it is determined in step S63 that no scramble code is present in the scramble code list, the cell detection section 5 despreads the reception data by using the remaining scramble codes (not stored in the memory section 8) belonging to the specified scramble code group (step S69). As a result of step S69, the correlation value is set to P (scramble code "C") (step S70).

If the correlation value P is equal to or larger than the predetermined cell detection threshold (step S71), the flow advances to step S67. Otherwise, the flow advances to step S72. In step S72, the cell detection section 5 starts a cell search again.

A cell search method in handover operation will be described next with reference to FIG. 10. During communication (step S81), a reception level measurement function in the reception section 4 periodically monitors the reception level of a visiting cell (step S82). If the reception level is equal to or higher than a threshold (step S83), the flow advances to step S84. Otherwise, the flow returns to step S81. In step S84, a cell search is started. Assume that a scramble code group is specified as a consequence (step S85). In this case, if any cell information (any scramble code belonging to the scramble code group) is stored in the memory section 8 (step S86), the flow advances to step S87. Otherwise, the flow advances to step S99.

If it is determined in step S87 that any of a plurality of scramble codes belonging to the specified scramble code group is stored as a neighboring scramble code of the visiting scramble code in the memory section 8 (step S88), the flow advances to step S89. Otherwise, the flow advances to step S93. In step S89, the cell detection section 5 despreads the reception data by using the neighboring scramble code of the visiting cell, which belongs to the specified scramble code group and is stored in the memory section 8.

As a result, the scramble code "C" with the largest correlation value P is selected (step S90). If this correlation value P is equal to or larger than the threshold (step S91), this scramble code "C" is specified as a detection cell code (step S92). Otherwise, the flow advances to step S93.

In step S93, the cell detection section 5 despreads the reception data by using the remaining scramble codes which belong to the specified scramble code group and are stored in the memory section 8. As a result, the scramble code "C" with the largest correlation value P is selected (step S94). If the correlation value P is equal to or larger than the threshold (step S95), the flow advances to step S92. Otherwise, the flow advances to step S96.

In step S96, the cell detection section 5 despreads the reception data by using the remaining scramble codes (not stored in the memory section 8) belonging to the specified scramble code group. As a result, the scramble code "C" with the largest correlation value P is selected (step S97). If the correlation value P is equal to or higher than the threshold (step S98), the flow advances to step S92. Otherwise, the flow advances to step S84. In step S99, the cell detection section 5 despreads the reception data by using all the scramble codes belonging to the specified scramble code group. In this case, the same cell search method as that in the prior art is used, and hence much time is required (steps S100 and S101).

Figure 10:
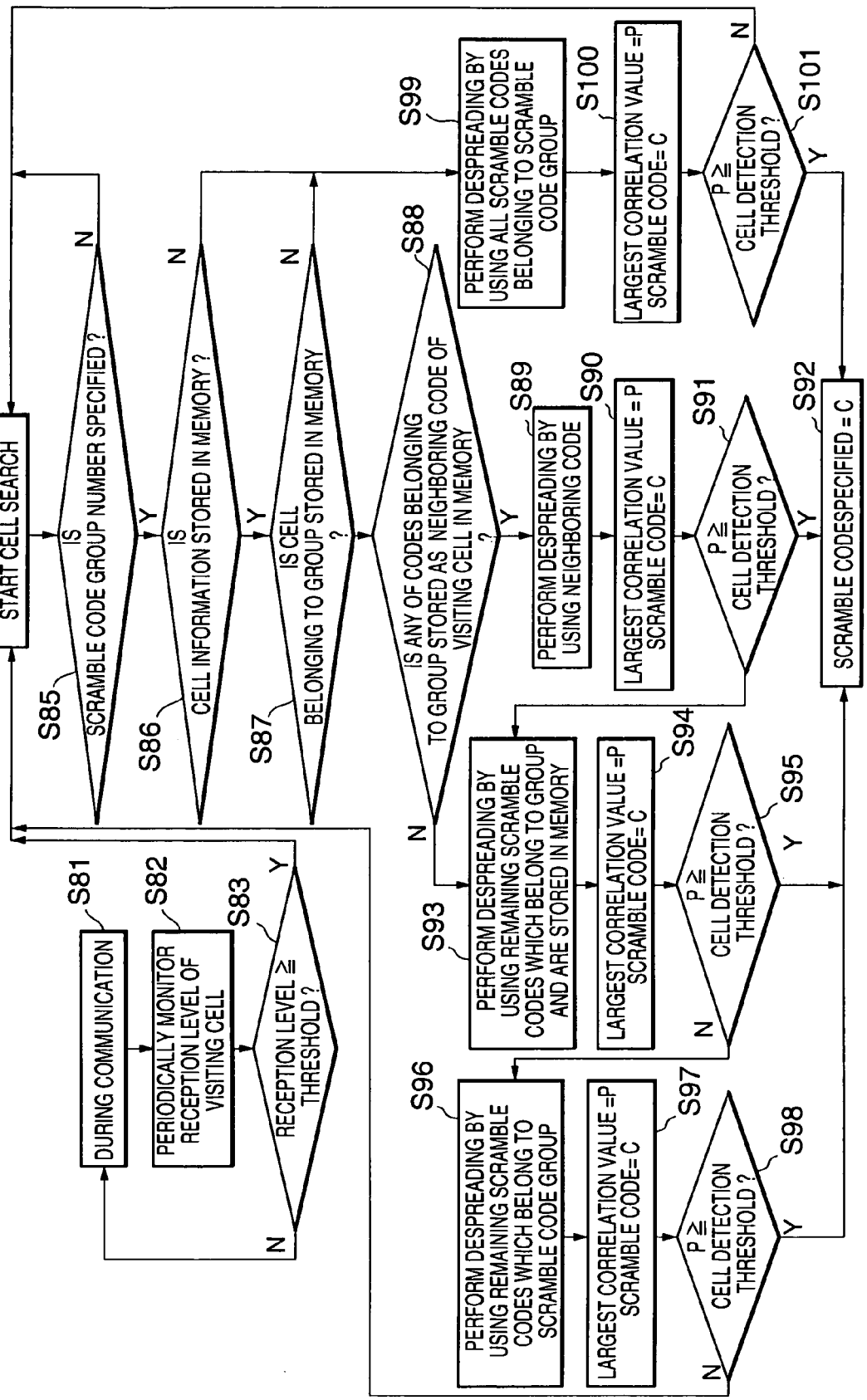
FIG. 10 is a flow chart showing a procedure in a cell search method in handover operation according to the present invention.

According to the method shown in FIG. 10, since a neighboring scramble code of a visiting scramble code is preferentially used in handover operation, the time required to detect a scramble code at the handover destination can be shortened.

Figure 1:
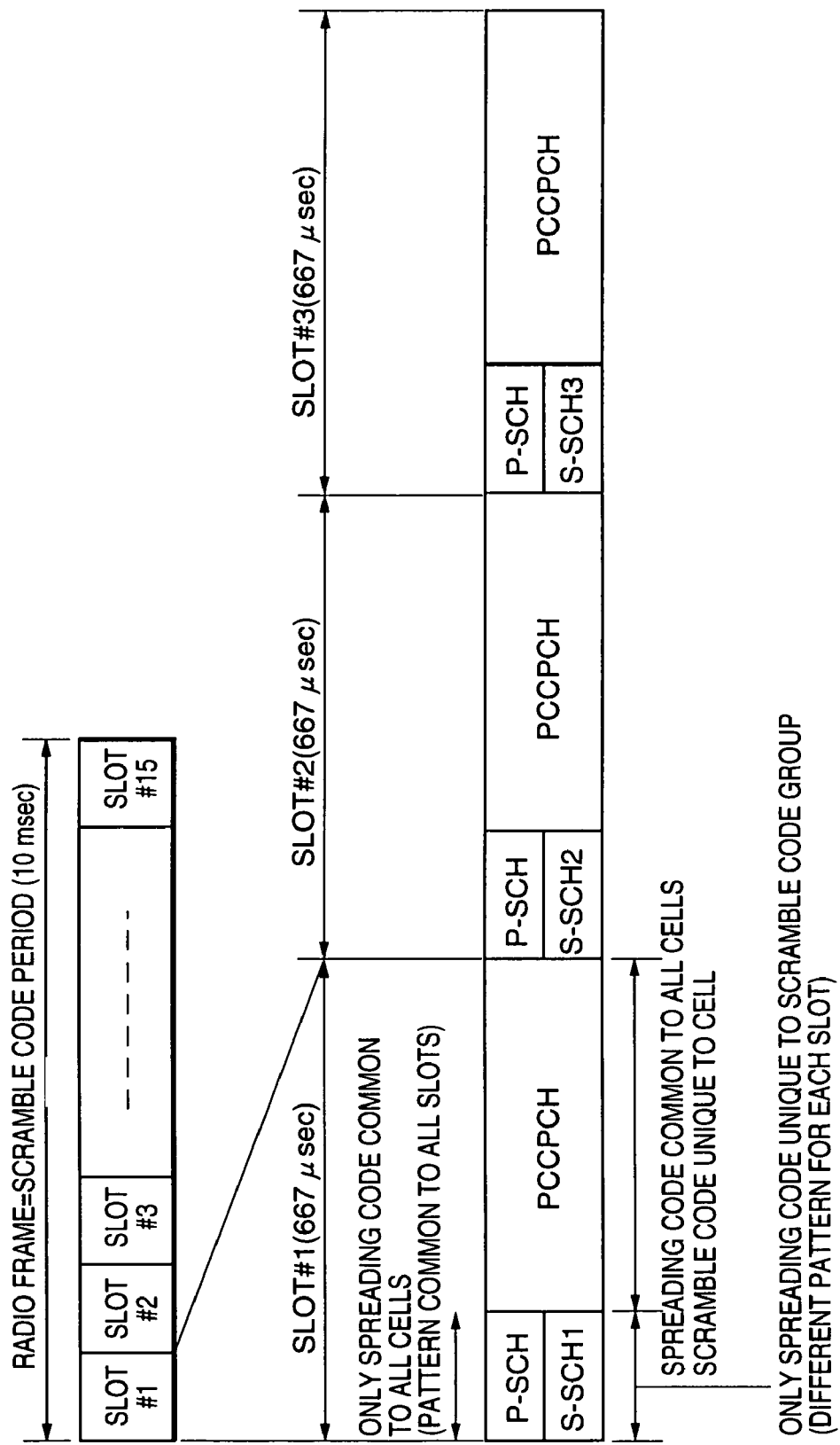
FIG. 1 is a view showing the format of a radio frame to explain a general cell search technique.
Figure 2:
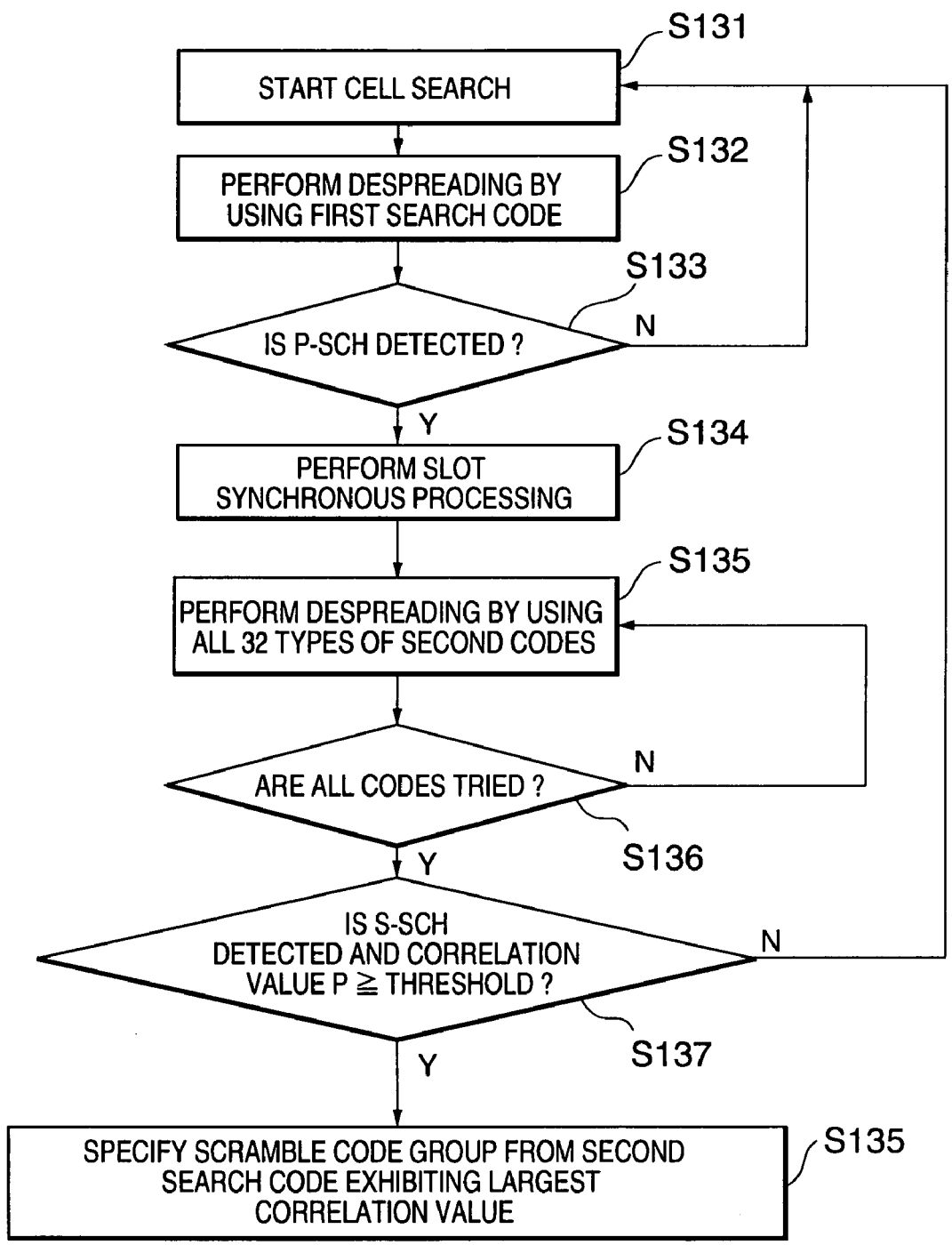
FIG. 2 is a flow chart showing a procedure in a conventional scramble code group specifying method.
Figure 8:
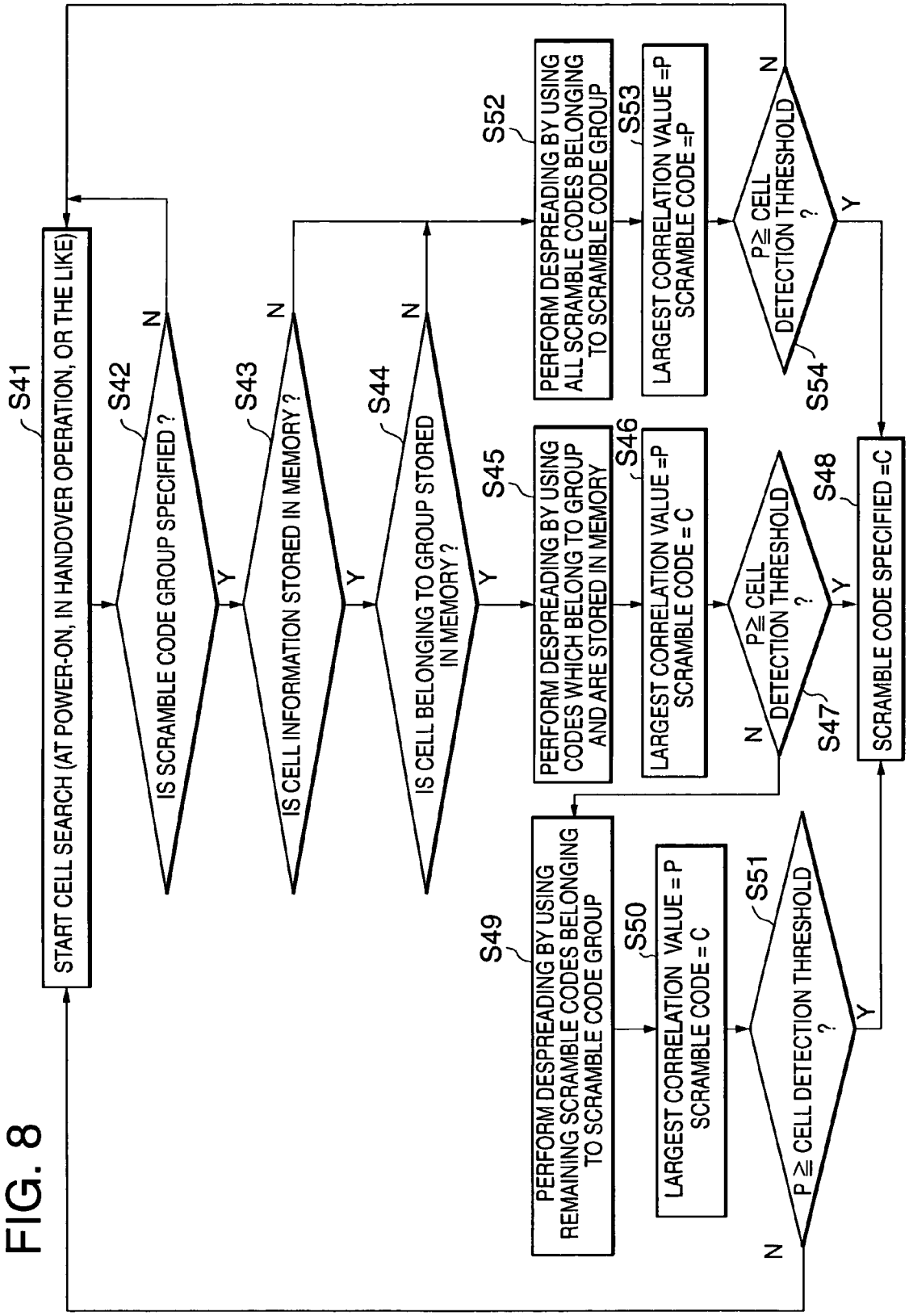
FIG. 8 is a flow chart showing a procedure in a cell search method according to the present invention.
Figure 9:
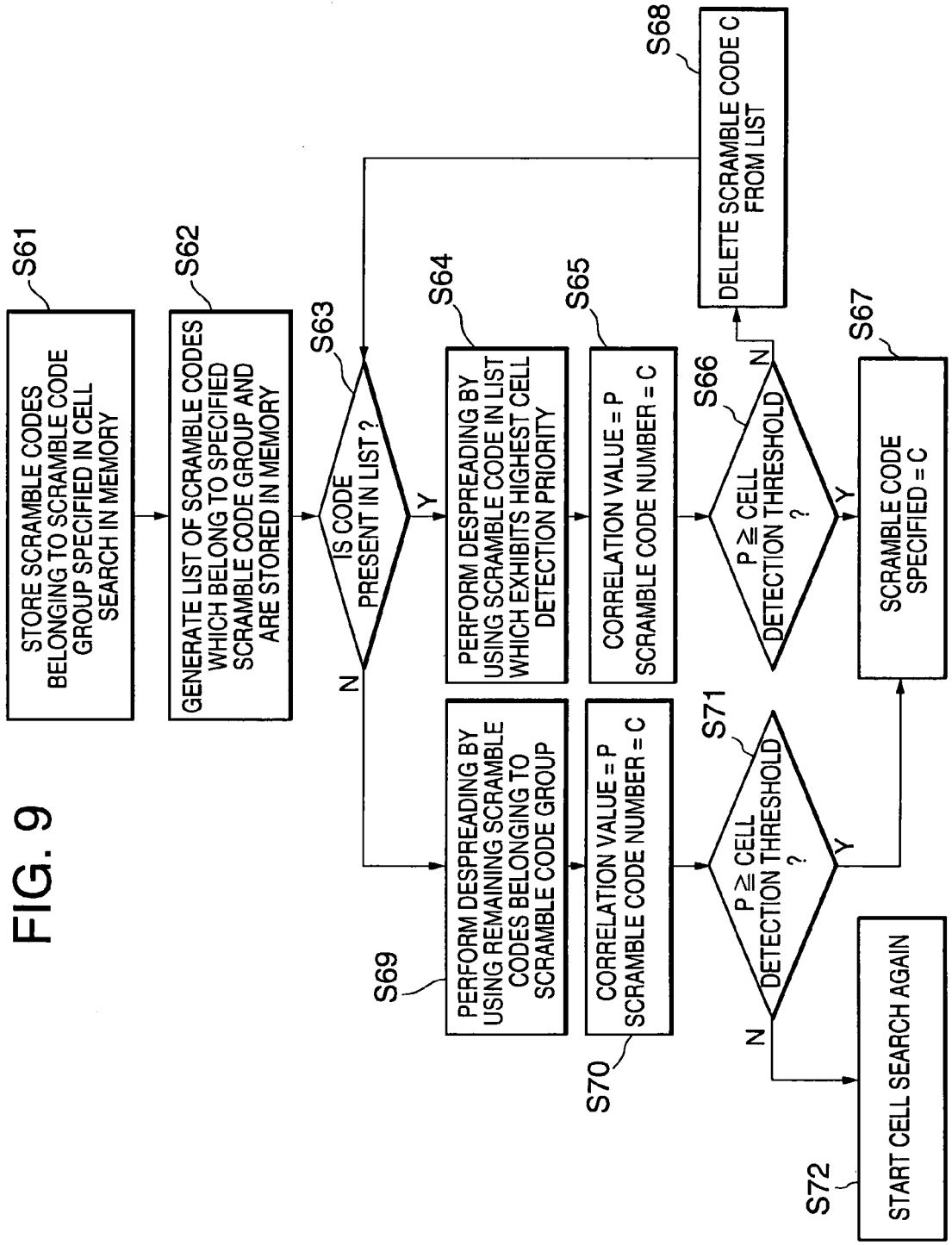
FIG. 9 is a flow chart showing a procedure in a faster cell search method according to the present invention.

In each of the operations shown in FIGS. 8 to 10, a method of specifying a scramble code group in a visiting cell (steps S42, S61, and S85) at the start of a cell search is not specifically limited, and the conventional method shown in FIG. 2 can be used. If, however, a scramble code is stored in the memory, together with a scramble code group (second search code) to which the scramble code belongs, as in the present invention, the time required to specify a scramble code group in cell search operation can be greatly shortened, as shown in the operation flow of FIG. 11.

Figure 11:
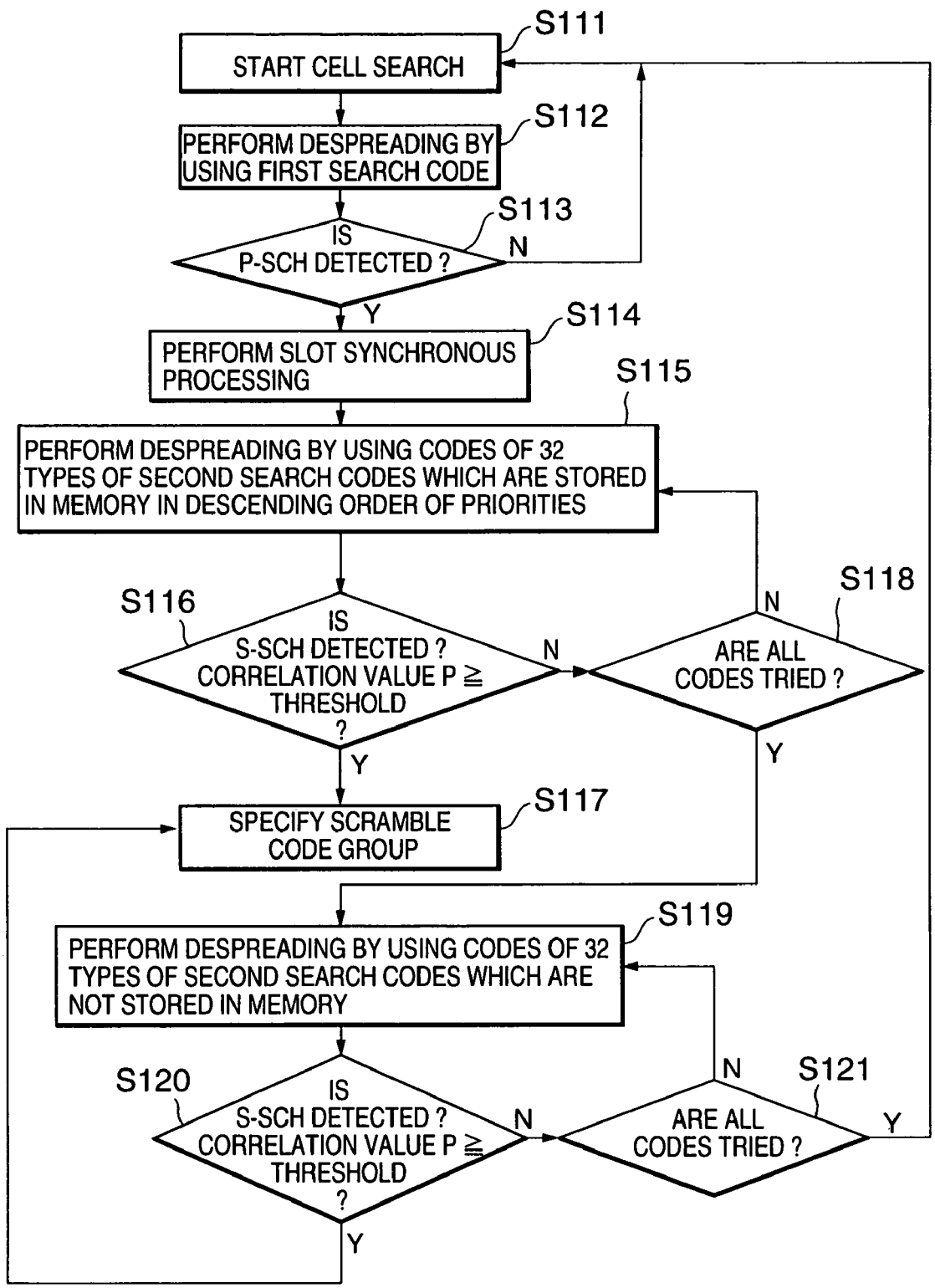
FIG. 11 is a flow chart showing a procedure in a scramble code group specifying method according to the present invention.

Steps S111 to S114 in FIG. 11 are the same as steps S131 to S134 in FIG. 2. In step S115, despreading is performed by using codes of the 32 types of second search codes which are stored in the memory section in the descending order of priorities. If the detected correlation value P is equal to or larger than the threshold (step S116), the flow advances to step S117. Otherwise, the flow advances to step S118.

In step S117, a scramble code group is specified from the second search codes. If it is determined in step S118 that despreading based on all the second search codes stored in the memory is completed, the flow advances to step S119. Otherwise, the flow advances to step S115. In step S119, despreading is performed by using codes of the 32 types of second search codes which are not stored in the memory.

If it is determined that the correlation value P is equal to or larger than the threshold (step S120), the flow advances to step S117. Otherwise, the flow advances to step S111. If it is determined that despreading based on all the second search codes which are not stored in the memory is completed (step S121), the flow returns to step S111. Otherwise, the flow returns to step S119.

According to this method, since the second search codes that are likely to be detected are preferentially used, the time required to specify a scramble code group can be shortened.

What is claimed is:

1. Mobile communication terminal equipment for a CDMA cellular phone system, comprising:
    detection means for performing cell detection by detecting scramble codes of a visiting cell and a neighboring cell;
    memory means for storing a scramble code;
    control means for controlling to write the scramble codes of the visiting cell and neighboring cell, detected by said detection means, into said memory means, upon assigning priorities thereto in detecting operation, in response to user operation; and
    measurement means for measuring detection frequencies of the scramble codes and intra-cell stay times;
    wherein:
        said control means controls said detection means so as to perform cell detection by preferentially using the scramble codes stored in said memory means,
        said control means controls said detection means so as to perform cell detection by using a plurality of scramble codes, stored in said memory means, in the descending order of priorities, and
        said control means controls the detection means so as to perform cell detection by using a scramble code other than the scramble codes stored in said memory means when cell detection cannot be performed by using the scramble codes stored in said memory means.

2. Equipment according to claim 1, wherein said control means controls said detection means so as to perform cell detection by preferentially using a scramble code stored in the memory means exhibiting a long stay time in the past.

3. A control method for cell detection in mobile communication terminal equipment for a CDMA cellular phone system, comprising:
    a detection step of performing cell detection by detecting scramble codes of a visiting cell and a neighboring cell;
    a storage step of storing the detected scramble codes of the visiting cell and the neighboring cell in a memory means, upon assigning priorities thereto in detecting operation, in response to user operation; and
    a measurement step of measuring detection frequencies of the scramble codes and intra-cell stay times;
    wherein:

the detection step comprises performing cell detection by preferentially using the scramble codes stored in the memory means upon assigning priorities thereto in detecting operation, the detection step comprises performing cell detection by preferentially using the scramble codes stored in the memory means, the detection step comprises performing cell detection by using a plurality of scramble codes, stored in the memory means, in descending order of priorities, and the detection step comprises performing cell detection by using a scramble code other than the scramble codes stored in the memory means when cell detection cannot be performed by using the scramble codes stored in the memory means.

4. A recording medium recording a program for a control method for cell detection in mobile communication terminal equipment for a CDMA cellular phone system, the program comprising:

a detection step of performing cell detection by detecting scramble codes of a visiting cell and a neighboring cell;

a storage step of storing the detected scramble codes of the visiting cell and neighboring cell in a memory means, upon assigning priorities to the detected scramble codes in the detection step, in response to user operation; and the measurement step of measuring detection frequencies of the scramble codes and intra-cell stay times;

wherein the detection step comprises performing cell detection by preferentially using the scramble codes stored in the memory means in descending order of priority, and the detection step comprises performing cell detection by using a scramble code other than the scramble codes stored in the memory means when cell detection cannot be performed by using the scramble codes stored in the memory means.

5. Mobile communication terminal equipment for a CDMA cellular phone system, comprising:

detection means for performing cell detection by detecting scramble codes of a visiting cell and neighboring cell;

memory means for storing a scramble code;

control means for automatically storing the scramble codes of the visiting cell and neighboring cell, detected by said detection means, into said memory means, upon assigning priorities thereto in the detection means, in accordance with the detection frequencies of the scramble codes; and measurement means for measuring detection frequencies of the scramble codes and intra-cell stay times;

wherein said control means controls said detection means so as to perform cell detection by preferentially using the scramble codes stored in said memory means in the descending order of priority, and said control means controls the detection means so as to perform cell detection by using a scramble code other than the scramble codes stored in said memory means when cell detection cannot be performed by using the scramble codes stored in said memory means.

6. Mobile communication terminal equipment for a CDMA cellular phone system, comprising:

detection means for performing cell detection by detecting scramble codes of a visiting cell and neighboring cell;

memory means for storing a scramble code;

control means for automatically storing the scramble codes of the visiting cell and neighboring cell, detected by said detection means, into said memory means, upon assigning priorities thereto in the detection means; and measurement means for measuring detection frequencies of the scramble codes and intra-cell stay times;

wherein said control means controls said detection means so as to perform cell detection by preferentially using the scramble codes stored in said memory means in the descending order of priority, and said control means controls the detection means so as to perform cell detection by using a scramble code other than the scramble codes stored in said memory means when cell detection cannot be performed by using the scramble codes stored in said memory means.

7. Equipment according to any one of claims 1, 5, and 6, wherein said control means controls said detection means so as to perform cell detection by preferentially using a scramble code stored in the memory means exhibiting a high detection frequency in the past.

8. A control method for cell detection in mobile communication terminal equipment for a CDMA cellular phone system, comprising:

the detection step of performing cell detection by detecting scramble codes of a visiting cell and neighboring cell;

the storage step of storing the detected scramble codes of the visiting cell and neighboring cell in a memory means in accordance with the detection frequencies of the scramble codes, upon assigning priorities thereto in the detection step; and the measurement step of measuring detection frequencies of the scramble codes and intra-cell stay times;

wherein the detection step comprises performing cell detection by preferentially using the scramble codes stored in the memory means, in the descending order of priorities, and the detection step comprises performing cell detection by using a scramble code other than the scramble codes stored in the memory means when cell detection cannot be performed by using the scramble codes stored in the memory means.

9. A control method for cell detection in mobile communication terminal equipment for a CDMA cellular phone system, comprising:

the detection step of performing cell detection by detecting scramble codes of a visiting cell and neighboring cell;

the storage step of storing the detected scramble codes of the visiting cell and neighboring cell in a memory means, upon assigning priorities thereto in the detection step; and the measurement step of measuring detection frequencies of the scramble codes and intra-cell stay times;

wherein the detection step comprises performing cell detection by preferentially using the scramble codes stored in the memory means, in the descending order of priorities, and the detection step comprises performing cell detection by using a scramble code other than the scramble codes stored in the memory means when cell detection cannot be performed by using the scramble codes stored in the memory means.

10. A method according to any one of claims 3, 8, and 9, wherein the detection step comprises performing cell detection by preferentially using a scramble code stored in the memory means exhibiting a high detection frequency in the past.

11. A method according to any one of claims 3, 8, and 9, wherein the detection step comprises performing cell detection by preferentially using a scramble code stored in the memory means exhibiting a long stay time in the past.

12. A method according to any one of claims 3, 8, and 9, wherein the detection step comprises the step of specifying a scramble code group at the time of detection of the scramble code, and the step of performing cell detection in accordance with a priority of a scramble code stored in the memory means which belongs to the specified scramble code group and is stored in the memory means.

13. A recording medium recording a program for a control method for cell detection in mobile communication terminal equipment for a CDMA cellular phone system, the program comprising:

the detection step of performing cell detection by detecting scramble codes of a visiting cell and neighboring cell;

the storage step of automatically storing the detected scramble codes of the visiting cell and neighboring cell in a memory means in accordance with the detection frequencies of the scramble codes, upon assigning priorities thereto in the detection step; and the measurement step of measuring detection frequencies of the scramble codes and intra-cell stay times;

wherein the detection step comprises performing cell detection by preferentially using the scramble codes stored in the memory means in the descending order of priority, and the detection step comprises performing cell detection by using a scramble code other than the scramble codes stored in the memory means when cell detection cannot be performed using the scramble codes store in the memory means.

14. A recording medium recording a program for a control method for cell detection in mobile communication terminal equipment for a CDMA cellular phone system, the program comprising:

the detection step of performing cell detection by detecting scramble codes of a visiting cell and neighboring cell;

the storage step of automatically storing the detected scramble codes of the visiting cell and neighboring cell in a memory means, upon assigning priorities thereto in the detection step; and the measurement step of measuring detection frequencies of the scramble codes and intra-cell stay times;

wherein the detection step comprises performing cell detection by preferentially using the scramble codes stored in the memory means in the descending order of priority, and the detection step comprises performing cell detection by using a scramble code other than the scramble codes stored in the memory means when cell detection cannot be performed using the scramble codes store in the memory means.

15. A medium according to any one of claims 4, 13, and 14, wherein the detection step comprises performing cell detection by preferentially using a scramble code stored in the memory means exhibiting a high detection frequency in the past.

16. A medium according to any one of claims 4, 9, and 14, wherein the detection step comprises performing cell detection by preferentially using a scramble code stored in the memory means exhibiting a long stay time in the past.

17. A medium according to any one of claims 4, 13, and 14, wherein the detection step comprises the step of specifying a scramble code group at the time of detection of the scramble code, and the step of performing cell detection in accordance with a priority of a scramble code stored in the memory means which belongs to the specified scramble code group and is stored in the memory means.

* * * * *